United States Patent
Iadonisi (10) Patent No.: US 11,208,229 B2
(45) Date of Patent: Dec. 28, 2021

(54) LABEL INSPECTION SYSTEM

(71) Applicant: Multi-Color Corporation, Batavia, OH (US)

(72) Inventor: Robert L. Iadonisi, Tyngsboro, MA (US)

(73) Assignee: Multi-Color Corporation, Batavia, OH (US)

( * ) Notice: Subject to any disclaimer, the term of this patent is extended or adjusted under 35 U.S.C. 154(b) by 296 days.

(21) Appl. No.: 16/372,554

(22) Filed: Apr. 2, 2019

(65) Prior Publication Data

US 2019/0300222 A1    Oct. 3, 2019

Related U.S. Application Data

(60) Provisional application No. 62/651,544, filed on Apr. 2, 2018.

(51) Int. Cl.
| | |
|---|---|
| *B65C 9/40* | (2006.01) |
| *G01N 21/88* | (2006.01) |
| *G01N 21/956* | (2006.01) |
| *G01N 21/892* | (2006.01) |

(52) U.S. Cl.
CPC .......... *B65C 9/40* (2013.01); *G01N 21/8806* (2013.01); *G01N 21/892* (2013.01); *G01N 21/956* (2013.01); *B65C 2009/407* (2013.01)

(58) Field of Classification Search
CPC .......................... B65C 9/40; B65C 2009/407; G01N 21/8806; G01N 21/956; G01N 2021/8893; G01N 21/892
See application file for complete search history.

(56) References Cited

U.S. PATENT DOCUMENTS

| | | | | |
|---|---|---|---|---|
| 2009/0314413 | A1* | 12/2009 | Brandow | B65B 61/26 156/64 |
| 2018/0079545 | A1* | 3/2018 | McNestry | B65C 9/44 |

\* cited by examiner

*Primary Examiner* — Kara E. Geisel
*Assistant Examiner* — Amanda Merlino
(74) *Attorney, Agent, or Firm* — Wood Herron & Evans LLP (57) ABSTRACT

A system, method, and apparatus for inspecting a label for proper application thereof. The system includes a label application apparatus and an inspection apparatus associated with said label application apparatus. The method includes inspecting a spent carrier web for the presence of labels, or portions thereof, that did not transfer to articles being labeled.

10 Claims, 6 Drawing Sheets

LABEL INSPECTION SYSTEM

CROSS-REFERENCE TO RELATED APPLICATIONS

This application claims priority to, and the benefit of the filing date of, U.S. Provisional Patent Application No. 62/651,544, titled "Tax Stamp Inspection System," filed on Apr. 2, 2018, the disclosure of which is incorporated by reference herein in its entirety.

FIELD OF THE INVENTION

The present invention relates to methods and systems for identifying misapplied labels, such as Tax Stamps, for correction of same.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

As is well known in the art, various types of labels (pressure sensitive labels, heat transfer labels, stamps, seals, etc.) are applied to various articles. And, as is known, during application such labels may be misapplied, such that the entire label, or a portion thereof, fails to properly transfer from a carrier web to the article being labeled. In certain circumstances, this misapplication may have certain consequences (monetary or otherwise)—such as when the proper application of a particular label is mandated by law. Examples include the application of Tax Stamps to various products—such as cigarettes.

Presently, in the United States, Tax Stamps on individual cigarette packs is a source of significant revenue mandated in 48 U.S. states as well as several individual counties and American Indian Tribes. Cigarette manufacturers distribute their products to all states with no Tax Stamp responsibilities. The individual distributors are then responsible to purchase Tax Stamps from the respective state which they intend to distribute those cigarettes and apply a serialized Tax Stamp to every individual pack of cigarettes before it leaves their facility.

Tax Stamp printers, suppliers, and subcontractors are collectively required to be Level 2 Security (L25), one level below printers of U.S. currency (L35). Tax Stamps must be adequately protected against counterfeiting and theft. That being the case, Tax Stamps are secured and treated much like currency in nearly every phase of manufacturing, shipping, distribution, and at the point of application at the individual distributors. The individual distributors acquire and maintain Tax Stamp application machine(s) to apply Tax Stamps to articles (such as cigarette packs).

While the individual stamps are well documented and secured up until the time they are applied to individual cigarette packs, the quality and completeness of an individual stamp, when transferred to a cigarette pack, is presently accepted by industry at a very low level. For example, if only 50% of a stamp transfers to a pack of cigarettes, it is considered acceptable. What further compounds this low level of acceptance is that current inspection methods for stamp application rely completely on manual inspection of the packs and awareness of the operator of the machine applying the Tax Stamps. Presently, this practice is considered to be the industry standard.

Currently, there are only two known Tax Stamp application machine suppliers in the United States: (1) RED Stamp, Inc. (of Grand Rapids, Mich.), and (2) United Silicone, Inc. (of Lancaster, N.Y.). And, regarding the application machines provided by these companies, the actual transfer of the Tax Stamps from a carrier web having the stamps thereon, to the cigarette packs, is crude. There are approximately 1,600 tax stamp application machines in the United States and, while newer machines are more reliable and handle the web stock better than old machines, the point of application hasn't changed in decades, and, at the point of application, all models are essentially the same. While more common on older model machines, many "missed stamps" are common throughout nearly every roll of labels (which may have 30,000 stamps per roll). In some locations, when a roll of labels is completed, it is not uncommon for an operator to inspect for partial or complete stamps that did not transfer properly to cigarette packs. If poor stamp transfer is discovered, the operator then manually hand stamps the pack using the remaining fragments or entire stamps left on the spent web. Due to the high value of each Tax Stamp, every stamp is recovered and transferred to a cigarette pack regardless of how badly it may be damaged or how complete the transfer is. Even illegible Tax Stamps are recovered and hand transferred with the expectation that, if found by inspectors, a fine may not be imposed merely because the distributor demonstrated a "reasonable effort" to make certain cigarette packs are stamped.

Every U.S. state has a random inspection process that is primarily focused on identifying any counterfeiting, which is fairly common in the industry. While state inspectors are focused on counterfeiting, they often also discover incorrect or incomplete Tax Stamp application, which results in fines to retailers and wholesalers. As an example, in the state of Nebraska the following fines are presently enforced against retailers of cigarettes: $5.00 per package (capped at a total of $100.00) for the first incident; a $150.00 penalty plus $5.00 per package (capped at a total of $250.00) for the second incident; and a $400.00 penalty plus $5.00 per package (capped at $500.00) thereafter. For wholesalers, the fines are: $25.00 per package (capped at a total of $500.00) for the first incident; and a $500.00 penalty plus $25.00 per package (capped at a total of $1,000) for incidents thereafter. Thus, the fines that may be assessed for incorrect or incomplete Tax Stamp application are not insubstantial.

Recently several states are beginning to pay more attention to the quality and completeness of Tax Stamp application, and are showing an indication of no longer accepting a transfer of 50% of a Tax Stamp to a product. As a result, distributors will likely be held to a higher standard, and thus will likely be subject to significant increases in fines.

A reliable means of inspection to ensure a high percentage (i.e., near 100%) of correctly stamped cigarette packs has not been developed or offered to date. As mentioned above, the current method for identification and correction of misapplied stamps is via manual inspection—which is time consuming, slow, and not reliable. Further, there are major challenges with the implementation of other methods or apparatus to inspect individual cigarette packs, which have prevented any change from manual inspection to date. These challenges include the following:

First, every Tax Stamp machine is design to accept random brands of cigarettes as they are loaded onto the machine. For example, if a retailer places an order with a distributor for 8 cartons of Marlboro, 6 cartons of Winston, 3 cartons of Parliament, 2 cartons of Lucky Strike, and so on, this is the sequence which the cartons are fed into the Tax Stamp machine. All machine models self-adjust for the different heights of various cigarette packs. At an average of 90 cartons per minute, immediately after stamping, carton flaps are closed and glued shut within fractions of milliseconds. This leaves no space to physically install an apparatus to inspect actual cigarette packs. To change this would require significant machine reconfiguration at a significant cost.

Second, the constantly changing graphics and artwork of a given cigarette brand presents an everchanging background "noise" at a very high rate of speed (linear motion), making it virtually impossible to distinguish between the background artwork and the Tax Stamp itself. The maximum time available to inspect one carton of cigarettes is approximately 500 milliseconds. To date no system exists that can resolve this difficult challenge.

Improvement in the application of certain labels (such as Tax Stamps) to articles, and improvement in the inspection of same, is needed.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

As described above, current methods of identifying misapplied labels are inadequate. As an example, current methods of identifying misapplied Tax Stamps (e.g., those applied to cigarette packs) are inadequate, as they rely completely of manual inspection, are time-consuming and unreliable, and the nature of Tax Stamp application machines does not allow for physical space or time for additional apparatus to observe and identify cigarette packs having misapplied stamps. Further, the problems in misapplication of Tax Stamps, compounded by the unreliable methods of identifying and correcting misapplied Tax Stamps, can lead to substantial fines against wholesalers and retailers.

Various aspects of the present invention, however, overcome the drawbacks described in the Background by providing methods, systems, and apparatus for inspecting the application of labels to articles—e.g., the application of Tax Stamps to products such as cigarette packs—for identification of misapplied labels. The various aspects of the present invention provide for visual inspection for misapplied labels via an apparatus in a manner that avoids the drawbacks of lack of physical space or time for such an apparatus (described above).

Various embodiments of the methods, systems, and apparatus of the present invention accomplish this by inspecting the spent web for residual portions of Tax Stamps to determine if there are incomplete Tax Stamps on "finished" cigarette packs. As described above, labels (such as the Tax Stamps) are supported on a carrier web prior to passing through a tax stamp applicator machine and being applied to an article. When the stamps are applied to an article, they are removed from the carrier web to be applied to the article (e.g., cigarette pack). However, when cigarette packs are not completely stamped with a Tax Stamp, the portion of the Tax Stamp that did not apply to the cigarette pack (or the entire stamp, if none of the stamp transferred) will remain on the spent carrier web as that web exits the tax stamp applicator machine.

Thus, one aspect of the present invention provides a method for inspecting the application of labels to articles, which includes methods for inspecting a spent carrier web for residual labels or label portions of non-applied or misapplied labels. In one embodiment, the method may be used to inspect at least residual tax stamps on a spent carrier web.

Another aspect of the present invention provides a system and/or apparatus for inspecting the application of labels to articles, which may include a combination of a label application apparatus, and an inspection apparatus associated with the label application apparatus. In certain embodiments, this may be used to assess the application of tax stamps to articles—and in such an embodiment, the combination described above may include a combination of a tax stamp applicator machine and a inspection apparatus (such as a vision system) associated with the tax stamp applicator machine. The inspection apparatus may be used to assess a spent carrier web—such as a carrier web exiting the label application apparatus (e.g., tax stamp applicator machine) following a process for the application of one or more labels to one or more articles.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, current methods of identifying misapplied labels are inadequate. As an example, current methods of identifying misapplied Tax Stamps (e.g., those applied to cigarette packs) are inadequate, as they rely completely of manual inspection, are time-consuming and unreliable, and the nature of Tax Stamp application machines does not allow for physical space or time for additional apparatus to observe and identify cigarette packs having misapplied stamps. Further, the problems in misapplication of Tax Stamps, compounded by the unreliable methods of identifying and correcting misapplied Tax Stamps, can lead to substantial fines against wholesalers and retailers.

Various aspects of the present invention, however, overcome the drawbacks described in the Background by providing methods, systems, and apparatus for inspecting the application of labels to articles—e.g., the application of Tax Stamps to products such as cigarette packs—for identification of misapplied labels. The various aspects of the present invention provide for visual inspection for misapplied labels via an apparatus in a manner that avoids the drawbacks of lack of physical space or time for such an apparatus (described above).

Various embodiments of the methods, systems, and apparatus of the present invention accomplish this by inspecting the spent web for residual portions of labels to determine if there are incomplete labels on "finished" articles. As described above, labels (such as Tax Stamps) are supported on a carrier web prior to passing through a label application apparatus (such as a tax stamp applicator machine) and being applied to an article. When the labels are applied to an article, they are removed from the carrier web to be applied to the article (e.g., cigarette pack). However, when articles are not completely labeled (e.g., not completely stamped with a Tax Stamp), the portion of the label that did not apply to the article (or the entire label, if none of the label transferred) will remain on the spent carrier web as that web exits the label application apparatus.

Thus, one aspect of the present invention provides a method for inspecting the application of labels to articles, which includes methods for inspecting a spent carrier web for residual labels or label portions of non-applied or misapplied labels. In one embodiment, the method may be used to inspect at least residual tax stamps on a spent carrier web.

Inspecting a spent web in certain embodiments, may occur while the web is stationary. This provides an opportunity to visually inspect the web while the web is not in motion and has no "background noise." This eliminates problems associated with inspection of label application (such as Tax Stamp application) described above.

While the inspection of the spent web, in certain embodiments, may be manual, in alternate embodiments of the method, the inspection of the spent web can be accomplished via use of an inspection apparatus (such as a vision system). The use of such an inspection apparatus eliminates the need for manual inspection (and the associated drawbacks with manual inspection described in the Background section). Further, such an inspection apparatus may inspect the web at much more rapid speeds than manual inspection. For example, when inspecting webs for Tax Stamps, an inspection apparatus may inspect 2 rows of 15 stamps (which equates to 3 cartons/30 packs of cigarettes) in 1500 milliseconds, which is 3 times faster than the time needed if such an apparatus were used to inspect individual cigarette packs (rather than the spent web).

Further, the present inventor has determined that backlighting the spent web may be used to provide further contrast to assist in distinguishing between the various percentages of applied or misapplied labels. In particular, such backlighting may be used with an apparatus for detection of misapplied stamps, in order to recognize and/or distinguish between varied percentage of applied or misapplied labels. Further, the method may include the use of software to allow a user to set acceptance criteria for the amount of label to be transferred to article, and can also provide a processor and user interface to renders and communicates the result, thereby providing a user with information regarding the application or misapplication of labels. Further, such processor may also provide an output signal to integrate with an "alarm" of choice such as a warning light, audible alarm, machine stoppage, or data collection to identify the specific packs that were not properly stamped.

Referring now to the Figures, another aspect of the present invention provides a system 10 and/or apparatus for inspecting the application of labels 12 to articles 14, which may include a combination of a label application apparatus 16, and an inspection apparatus 18 associated with the label application apparatus 16. In certain embodiments, this may be used to assess the application of tax stamps to articles 14—and in such an embodiment, the combination described above may include a combination of a tax stamp applicator machine and an inspection apparatus 18 (such as a vision system) associated with the tax stamp applicator machine. The inspection apparatus 18 may be used to assess a spent carrier web 20—such as a carrier web exiting the label application apparatus 16 (e.g., tax stamp applicator machine) following a process for the application of one or more labels 12 to one or more articles 14.

As described above, the inspection apparatus 18 may be used to assess a spent carrier web 20. To do so, in one embodiment, the inspection apparatus 18 may be positioned relative to the label application apparatus 16 to examine a carrier web 20 following removal of at least one label 12, or a portion thereof, from the carrier web 20. In one particular embodiment, the inspection apparatus 18 may be positioned relative to the label application apparatus 16 to examine a carrier web 20 that has exited from the label application apparatus 16. Alternatively, the examination/assessment may occur at a point in the labeling process when the web has not exited from the label application apparatus 16.

The label 12 being applied to the article 14 (and thus the labels, or portions thereof, that may remain on a spent carrier web) may include (but is not limited to) a tax stamp, a pressure sensitive label, a heat transfer label, and a seal. In one particular embodiment, the label 12 is a tax stamp, and thus the label application apparatus 16 is a tax stamp applicator in this embodiment. In one particular embodiment, the inspection apparatus 18 may be a vision system, or a component thereof.

The system 10 for inspecting the application of labels 12 to articles 14 may further include a light source 22 positioned to backlight the carrier web 20 relative to the inspection apparatus 18. As described above, backlighting the spent web may be used to provide further contrast to assist in distinguishing between the various percentages of applied or misapplied labels 24. In particular, such backlighting may be used with an apparatus for detection of misapplied stamps, in order to recognize and/or distinguish between varied percentage of applied or misapplied labels. In certain embodiments, the light source 22 may be a component of the inspection apparatus 18 itself. Alternatively, the light source 22 may be a separate component in the system 10.

The inspection apparatus 18 may further include at least one sensor 26 to detect one or more properties of a carrier web 20, and generate a result based on the one or more properties. In various embodiments of the system 10, the one or more properties may include detecting the presence of a label 12, or a portion thereof, on the carrier web 20.

Figure 3A:
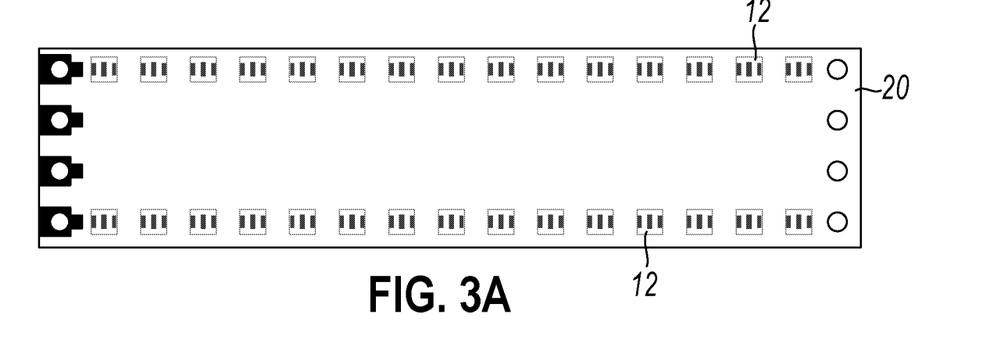
FIG. 3A is a view of a spent carrier web with 100% acceptable transfer of labels from the middle rows of the web.
Figure 3B:
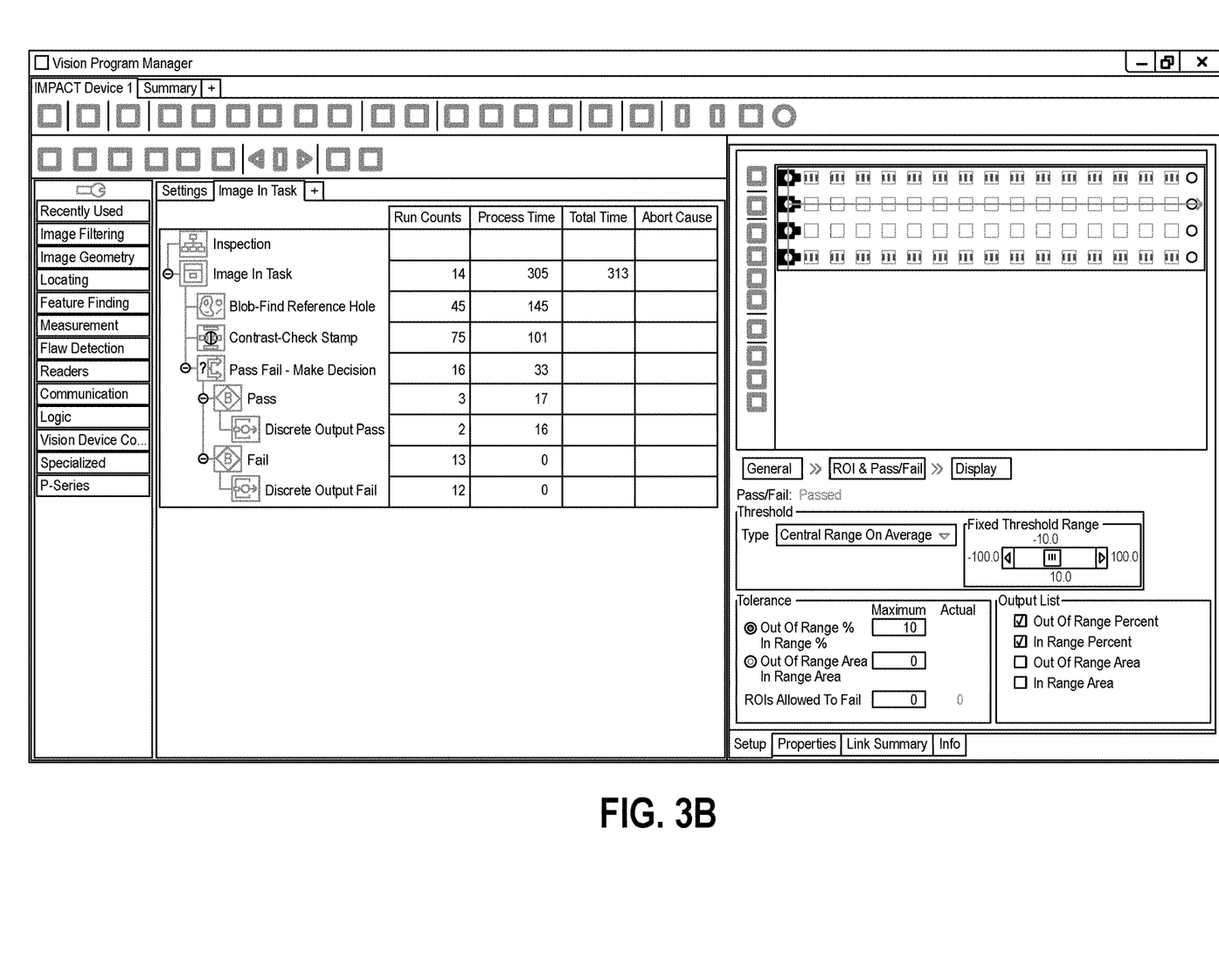
FIG. 3B is a representation of a user interface informing an operator of 100% acceptable transfer of labels.
Figure 4A:
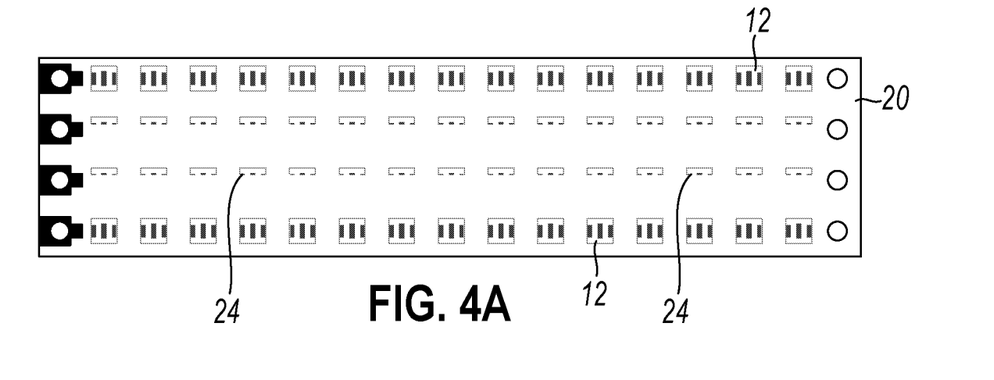
FIG. 4A is a view of a spent carrier web with 30% incomplete transfer of labels from the middle rows of the web.
Figure 4B:
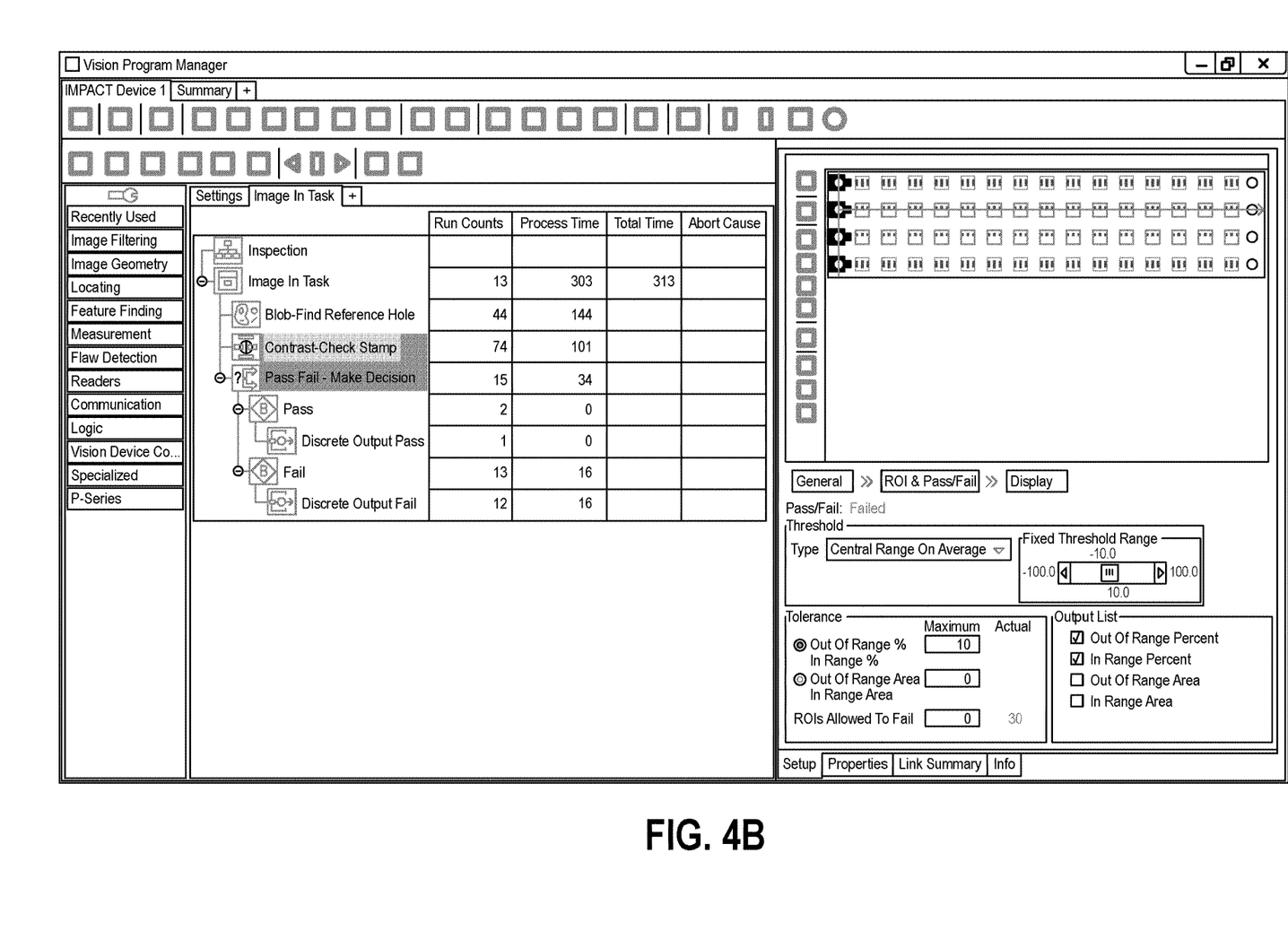
FIG. 4B is a representation of a user interface informing an operator of 30% incomplete transfer of labels.
Figure 5A:
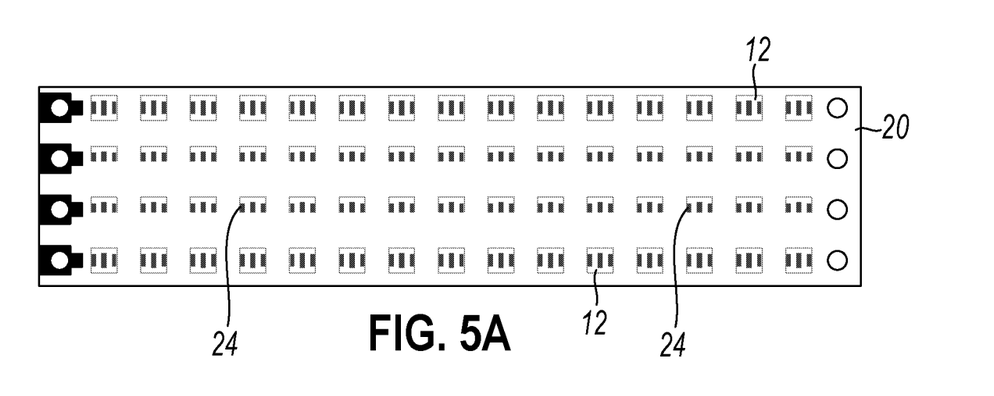
FIG. 5A is a view of a spent carrier web with 60% incomplete transfer of labels from the middle rows of the web.
Figure 5B:
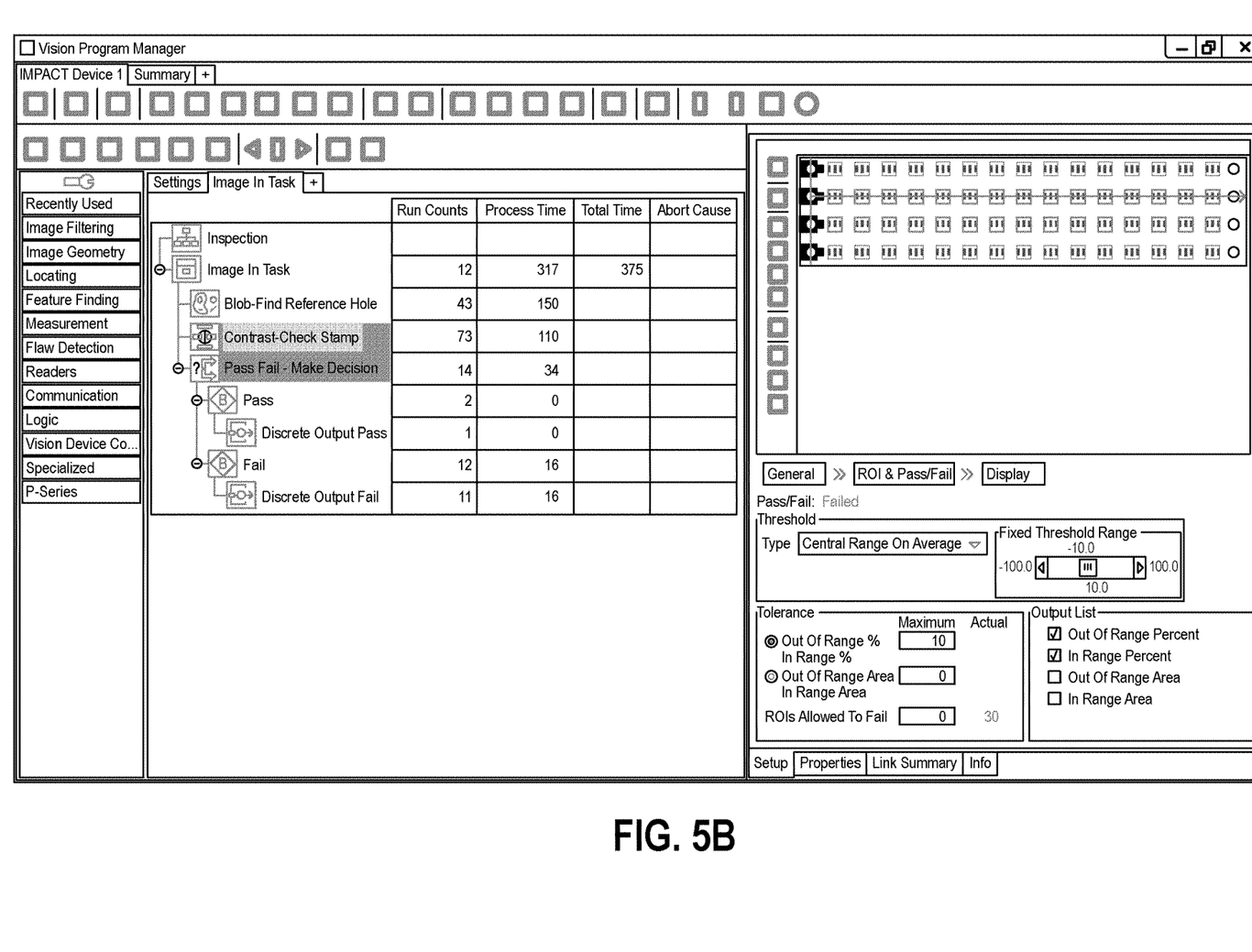
FIG. 5B is a representation of a user interface informing an operator of 60% incomplete transfer of labels.

Additionally, the inspection system may further include at least one processor communicably coupled to the at least one sensor 26. In certain embodiments, the at least one processor may receive the result from the at least one sensor 26, and compare the result to a criteria. The processor may then generate a report based on the comparison of the result to the criteria, and provide the report to a user interface 28 communicably coupled to the inspection apparatus 18. As one example, the criteria may be an upper threshold level based on a percentage of a label 12 detected to be present on said carrier web 20. Further, the processor may direct an action when the comparison of the result to the criteria demonstrates a percentage of label 12 present on the carrier web 20 that exceeds the upper threshold level. Referring to FIGS. 3A-6B, one can see various examples of labels 12 to be transferred to articles 14, and the resulting user interface 28 once the inspection apparatus 18 has assessed a spent web. In FIG. 3A, it can be seen that all labels, and all portions thereof, from the middle two rows of labels were successfully removed from the web and applied to articles 14 via the label application apparatus 16. Corresponding FIG. 3B shows the report of results to the user interface 28—and not reporting a failure. In FIG. 4A, it can be seen that 30% of each of the labels 12 from the middle two rows of labels 12 were not removed from the carrier web 20, and were not applied to articles 14 via the label application apparatus 16. Corresponding FIG. 4B shows the report of results to the user interface 28—and shows the reporting of a failure under the "Contrast-Check Stamp" and "Pass Fail—Make Decision" headings of the "Image In Task" tab of the reporting screen on the user interface 28. And, in FIG. 5A, it can be seen that 60% of each of the labels 12 from the middle two rows of labels were not removed from the carrier web 20, and were not applied to articles 14 via the label application apparatus 16. Corresponding FIG. 5B shows the report of results to the user interface 28—and shows the reporting of a failure under the "Contrast-Check Stamp" and "Pass Fail—Make Decision" headings of the "Image In Task" tab of the reporting screen on the user interface 28.

Thus, for example, one may set the criteria to be an upper threshold level of 30% of a label. This can be set such that 30% or more of a remaining label on a spent carrier web 20 would meet the criteria—whereas less than 30% of a remaining label will not meet the criteria The sensor 26 may then detect the presence of a remaining portion of a label that did not transfer properly to the article 14 being labeled. In this example, if that portion of the label constitutes 30% or more of the total label, the processor may direct an action to be taken.

In certain embodiments the action is chosen from activation of an alarm, stoppage of the label application apparatus 16, data collection that identifies specific labels 12 not properly applied, or a combination of these actions.

As described above, inspecting a spent web provides an opportunity to visually inspect the web while the web is not in motion and has no "background noise." This eliminates problems associated with inspection of Tax Stamp application described above. And, the system may include—or the apparatus may be—a vision system. Such a vision system uses at least one sensor 26 (e.g., at least one camera), processing hardware, and software to automate the previously manually performed visual inspection tasks—such as inspection of application of Tax Stamps.

Figure 1:
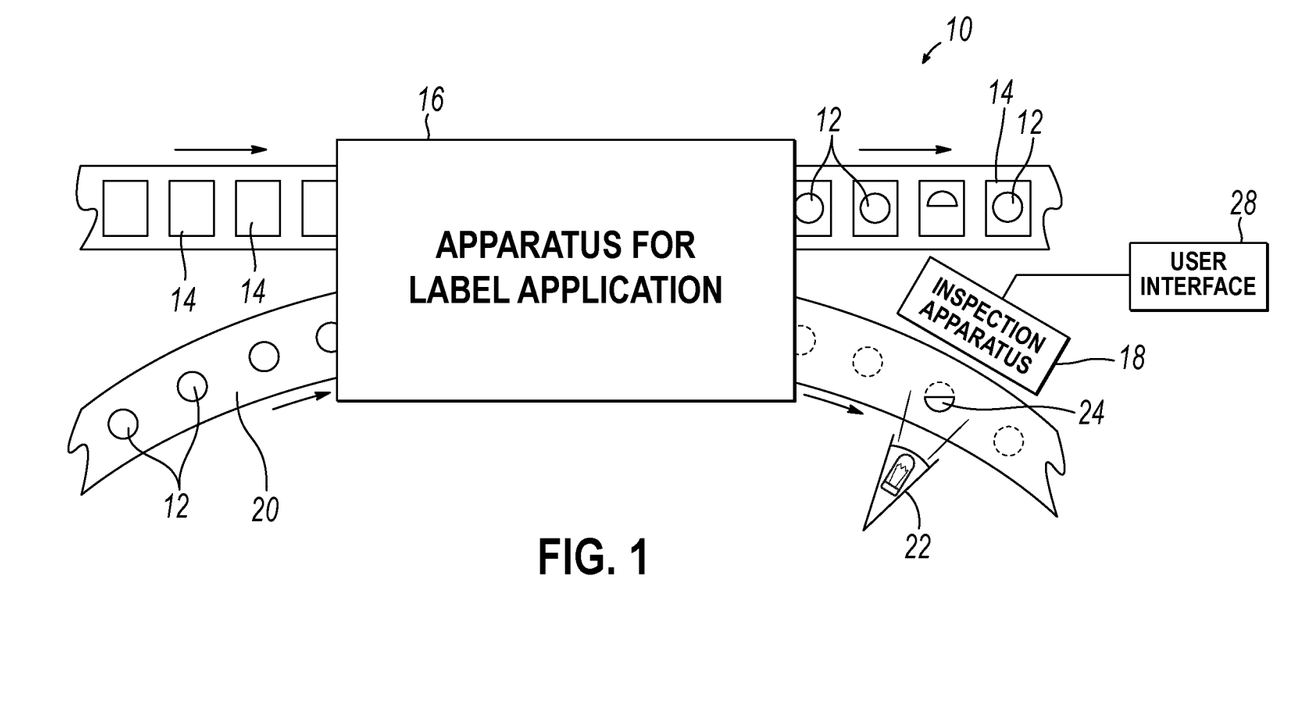
FIG. 1 is a schematic of a system for inspecting and/or assessing the application of labels to articles, the system including at least an apparatus for label application and an inspection apparatus.
Figure 2:
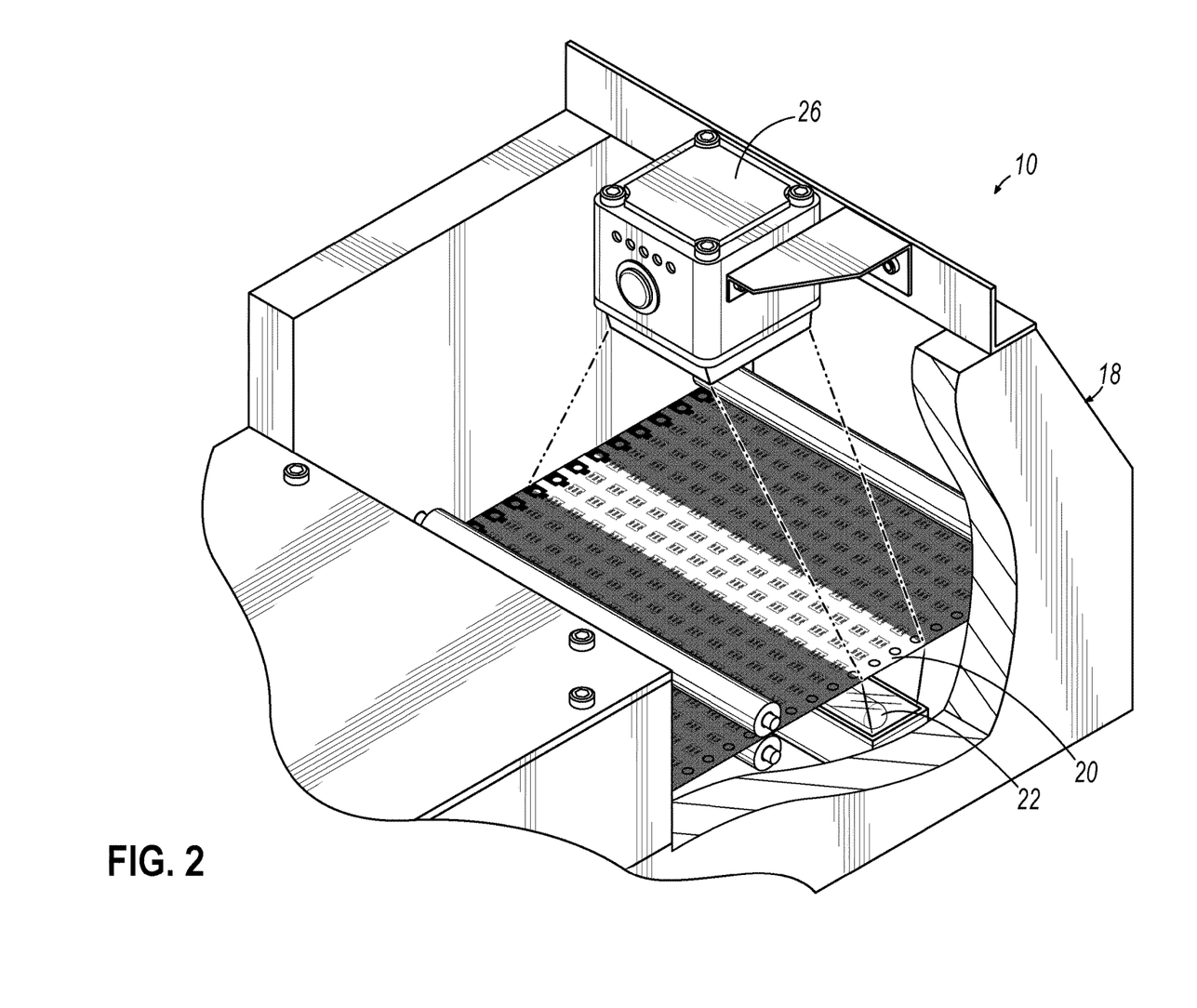
FIG. 2 is a perspective and cutaway view of a portion of a system for inspecting and/or assessing the application of labels to articles showing a carrier web with labels thereon in conjunction with a sensor positioned to detect labels or portions thereof on a spent carrier web.

The use of an apparatus, such as a vision system, eliminates the need for manual inspection (and the associated drawbacks with manual inspection described in the Background section). Further, as described above, such an apparatus may inspect 2 rows of 15 stamps (which equates to 3 cartons/30 packs of cigarettes) in 1500 milliseconds, which is 3 times faster than the time needed if such an apparatus were used to inspect individual cigarette packs (rather than the spent web). As described above, inspecting a spent web provides an opportunity to visually inspect the web while the web is not in motion and has no "background noise." (In the embodiment shown in FIG. 2, the web may be held still for a brief moment to allow the at least one sensor 26—e.g., camera—of the vision system to take a picture of that portion of the spent web. Alternatively, the sensor 26 may operate while the web is in motion.)

And, as described above with respect to the method, the system 10 and/or apparatus may further include backlighting the spent web to provide contrast to assist in distinguishing between the various percentages of applied or misapplied Tax Stamps. In particular, such backlighting may be used with an apparatus for detection of misapplied stamps, in order to recognize and/or distinguish between varied percentage of applied or misapplied Tax Stamps. And so, the system 10 and/or apparatus may include a light used and positioned to properly backlight the spent web to provide this contrast for the at least one sensor 26. Further, software may be provided to allow a user to set acceptance criteria for the amount of Tax Stamp to be transferred to article 14, and can also provide a user interface 28 to provide a user with information regarding the application or misapplication of Tax Stamps. Further, such software may also provide an output signal to integrate with an "alarm" of choice such as a warning light, audible alarm, machine stoppage or data collection to identify the specific packs that were not properly stamped.

A method, system, and/or apparatus for label inspection, such as that described herein, would greatly reduce or eliminate the number of articles that are mislabeled (such as cigarette packs that are sold to consumers either lacking Tax Stamps or having misapplied Tax Stamps. Doing so would minimize and/or eliminate financial burden due to fines imposed by State Inspectors who identify unacceptable Tax Stamp identification. Further, such an installed inspection system would provide immediate feedback to any malfunction that causes incomplete stamping. This will eliminate the need to manually search back into "finished goods" to identify unacceptable product. Further still, the aspects of the present invention allow this to be done without any costly changes to the present configuration of a Tax Stamp application machine. Backlighting and a vision system can be added to every model Tax Stamp application machine with minimal cost and virtually no rework to current machine configuration. And, automated data collection will provide a high level of security and documentation.

The embodiments of the present invention recited herein are intended to be merely exemplary and those skilled in the art will be able to make numerous variations and modifications to it without departing from the spirit of the present invention. Notwithstanding the above, certain variations and modifications, while producing less than optimal results, may still produce satisfactory results. All such variations and modifications are intended to be within the scope of the present invention as defined by the claims appended hereto.

What is claimed is:

1. A system for inspection of label application, comprising:
- a label application apparatus and an inspection apparatus associated with said label application apparatus;
- wherein the inspection apparatus further comprises:
    - (i) at least one sensor to detect one or more properties of a carrier web, and generate a result based on the one or more properties; and
    - (ii) at least one processor communicably coupled to the at least one sensor, wherein the at least one processor receives the result from the at least one sensor, and compares the result to a criteria, wherein the criteria is an upper threshold level based on a percentage of a label detected to be present on said carrier web;
- wherein the processor generates a report based on the comparison of the result to the criteria, and provides said report to a user interface communicably coupled to the inspection apparatus; and
- wherein said inspection apparatus is positioned relative to said label application apparatus to examine the carrier web following removal of the label, or a portion thereof, from said carrier web.

2. The system of claim 1, wherein said label is chosen from a tax stamp, a pressure sensitive label, a heat transfer label, and a seal.

3. The system of claim 1, wherein said inspection apparatus is positioned relative to said label application apparatus to examine said carrier web that has exited from said label application apparatus.

4. The system of claim 1, wherein said label application apparatus is a tax stamp applicator.

5. The system of claim 1, further comprising a light source positioned to backlight the carrier web relative to the inspection apparatus.

6. The system of claim 5, wherein the light source is a component of the inspection apparatus.

7. The system of claim 1, wherein the one or more properties includes detecting the presence of the label, or the portion thereof, on the carrier web.

8. The system of claim 1, wherein the processor directs an action when the comparison of the result to the criteria demonstrates a percentage of the label present on the carrier web that exceeds the upper threshold level.

9. The system of claim 8, wherein said action is chosen from activation of an alarm, stoppage of the label application apparatus, data collection that identifies specific labels not properly applied, or a combination of these actions.

10. The system of claim 1, wherein the inspection apparatus comprises a vision system.

* * * * *

UNITED STATES PATENT AND TRADEMARK OFFICE
CERTIFICATE OF CORRECTION

| | |
|---|---|
| PATENT NO. | : 11,208,229 B2 |
| APPLICATION NO. | : 16/372554 |
| DATED | : December 28, 2021 |
| INVENTOR(S) | : Robert L. Iadonisi |

It is certified that error appears in the above-identified patent and that said Letters Patent is hereby corrected as shown below:

In the Specification

Column 2, Line 65, "design" should be --designed--.

Column 3, Line 37, "of manual inspection," should be --on manual inspection,--.

Column 5, Line 13, "of manual inspection," should be --on manual inspection,--.

Column 6, Line 13, "percentage" should be --percentages--.

Column 7, Line 3, "percentage" should be --percentages--.

Column 7, Line 56, "label will not meet the criteria The sensor 26 may" should be --label will not meet the criteria. The sensor 26 may--.

Column 8, Line 48, "packs" should be --packs)--.

Signed and Sealed this
Seventeenth Day of May, 2022

Katherine Kelly Vidal
*Director of the United States Patent and Trademark Office*